United States Patent
Zhang et al.

(10) Patent No.: US 12,301,334 B2
(45) Date of Patent: May 13, 2025

(54) MULTI-BEAMFORMING OPTIMIZATION METHOD FOR SPACE-BASED ADS-B BASED ON COVERAGE MATRIX

(71) Applicant: Beihang University, Beijing (CN)

(72) Inventors: Xuejun Zhang, Beijing (CN); Xueyuan Li, Beijing (CN); Yuanhao Tan, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/277,238

(22) PCT Filed: Jan. 17, 2023

(86) PCT No.: PCT/CN2023/072570
§ 371 (c)(1),
(2) Date: Aug. 15, 2023

(87) PCT Pub. No.: WO2024/108756
PCT Pub. Date: May 30, 2024

(65) Prior Publication Data
US 2025/0007602 A1    Jan. 2, 2025

(30) Foreign Application Priority Data

Nov. 22, 2022    (CN) .......................... 202211463835.1

(51) Int. Cl.
*H04B 7/185*    (2006.01)
*H04B 7/06*    (2006.01)

(52) U.S. Cl.
CPC ....... *H04B 7/18513* (2013.01); *H04B 7/0617* (2013.01)

(58) Field of Classification Search
CPC .......................... H04B 7/18513; H04B 7/0617
(Continued)

(56) References Cited

U.S. PATENT DOCUMENTS

| 2022/0159544 | A1  | 5/2022 | Gupta |
| 2022/0209849 | A1* | 6/2022 | Maisonnat ......... H04B 7/18506 |
| 2023/0186482 | A1* | 6/2023 | Rahmes .................... G06T 7/13 |
|  |  |  | 382/199 |

FOREIGN PATENT DOCUMENTS

| CN | 104360323 | 2/2015 |
| CN | 108418610 | 8/2018 |
| CN | 114389650 | 4/2022 |

OTHER PUBLICATIONS

Zhang et al., "A Review of Development of Space-based ADS-B system and its key technologies" Journal of Beijing University of Aeronautics and Astronautics, vol. 48, No. 9, Sep. 30, 2022.

(Continued)

*Primary Examiner* — Fitwi Y Hailegiorgis
(74) *Attorney, Agent, or Firm* — NZ CARR LAW OFFICE

(57) ABSTRACT

The present invention discloses a multi-beamforming optimization method for space-based ADS-B based on a coverage matrix. The method includes: calculating signal-to-noise ratios of received signals based on an ADS-B signal model and an air-space channel model; deriving the correct reception probability of ADS-B signals by a satellite with different signal-to-noise ratios and with different numbers of aircraft on the basis of analyzing a correct decoding probability and a collision probability; and in the case that the constraint of satellite coverage metric is satisfied, aiming at minimizing the update interval of position messages at the update probability of 95%, establishing a digital multi-beamforming optimization model for space-based ADS-B.

10 Claims, 1 Drawing Sheet

(58) Field of Classification Search
USPC .......................................................... 375/211
See application file for complete search history.

(56) References Cited

OTHER PUBLICATIONS

Yu, Sunquan et al. "Adaptive Multi-beamforming for Space-based ADS-B" the Journal of Navigation, vol. 72, No. 2, Mar. 31, 2019, 359-374.
English translation of International Search Report for PCT/CN2023/072570 issued on Jul. 21, 2023.

* cited by examiner

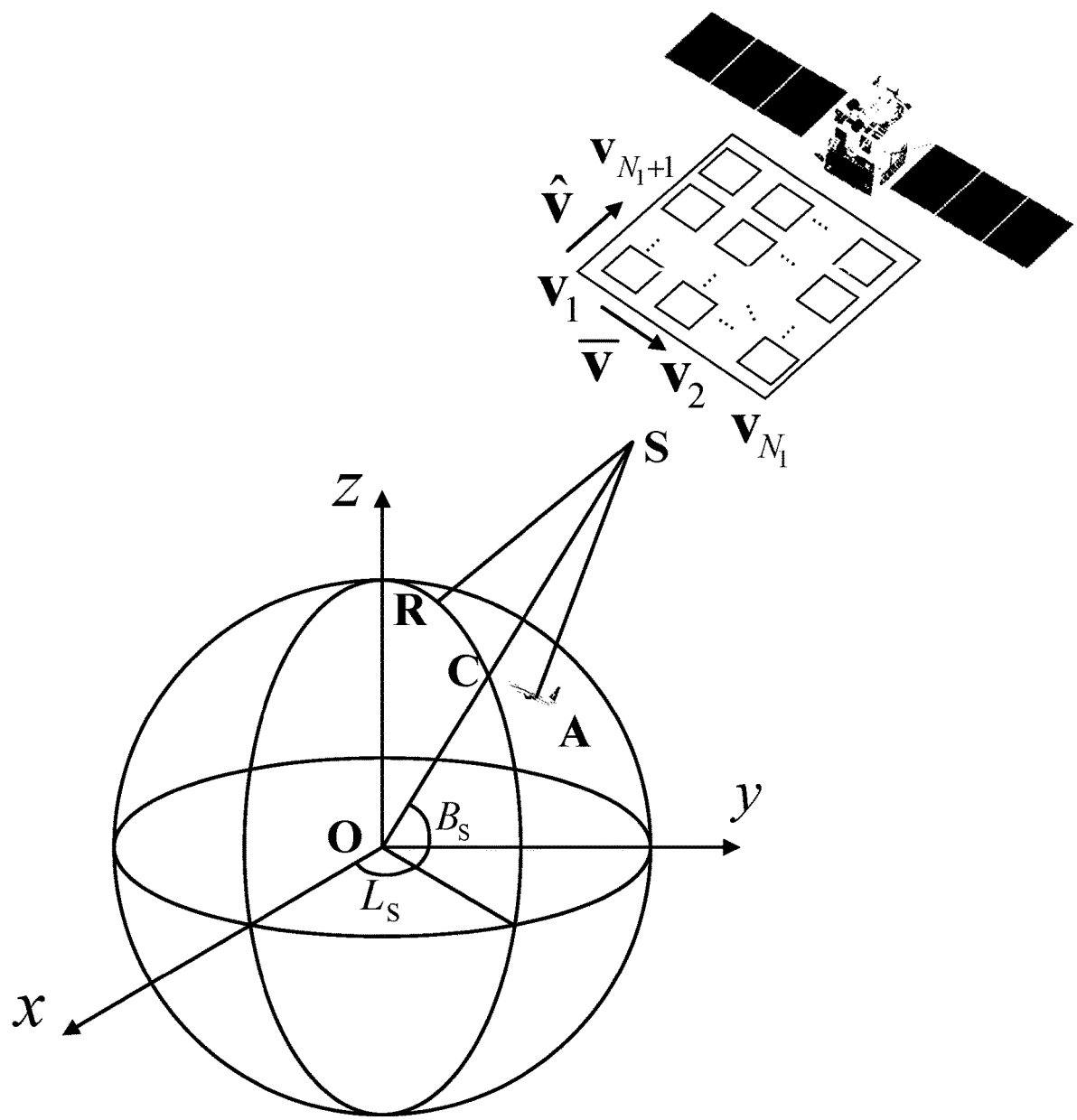

MULTI-BEAMFORMING OPTIMIZATION METHOD FOR SPACE-BASED ADS-B BASED ON COVERAGE MATRIX

TECHNICAL FIELD

The present invention belongs to the field of civil aviation technologies, and, in particular, relates to a multi-beamforming optimization method for space-based Automatic Dependent Surveillance-Broadcast (ADS-B) based on a coverage matrix.

BACKGROUND

For a space-based ADS-B system used in the field of civil aviation technologies, an ADS-B signal receiver is mounted on a low-orbit satellite, and with the characteristics of global coverage and no topographical occlusion of a satellite system, flights around the world can be continuously and seamlessly surveilled in real time. However, due to the increase in orbital altitude and coverage range, the space-based ADS-B system undergoes high probability of signal collision and serious co-channel interference. In order to alleviate the degradation of the surveillance performance of the space-based ADS-B system due to the co-channel interference, two main research directions have emerged at present. In one research direction, a deinterleaving algorithm is used during the processing of space-based ADS-B signals, but the deinterleaving algorithm for the space-based ADS-B signals has a high requirement for the signal-to-noise ratios (SNRs) of the signals, and also has high complexity, so it is difficult to achieve a good application result under the condition of limited low-orbit satellite resources. In the other research direction, phased-array antennas are used to spatially separate signals through multi-beam reception, thereby reducing the collision probability. However, the existing multi-beamforming optimization model proposed so far only verifies that the beam coverage can be optimized to reduce the update interval according to the aircraft distribution, without considering either the coverage of all beams of the satellite, or the effects of different correct decoding probabilities of signals with different SNRs.

SUMMARY

In view of this, an object of the present invention is to provide a multi-beamforming optimization method for space-based ADS-B based on a coverage matrix, in order to solve the problem that the multi-beamforming optimization model in the prior art does not consider the coverage of all beams of a satellite and the effects of different correct decoding probabilities of signals with different SNRs.

To achieve the object above, the present invention provides the following technical solutions.

The present invention provides a multi-beamforming optimization method for space-based ADS-B based on a coverage matrix. The method includes the steps of:

S1: establishing a digital multibeam reception scenario for space-based ADS-B signals, determining a position of an ADS-B satellite and a distribution condition of aircraft under the coverage of the satellite, and calculating a signal-to-noise ratio for each aircraft in each beam according to a digital beamforming vector;

S2: performing analysis according to signal-to-noise ratio of received signal to obtain a correct decoding probability of the signal and a signal collision probability, as well as a rate at which Mode A/C signals, Mode Select (Mode S) signals, and ADS-B signals that cause co-channel interference in each beam for each aircraft reach the satellite;

S3: calculating correct reception probability of the ADS-B signals by the satellite with different signal-to-noise ratios and with different number of aircraft;

S4: determining an update interval of position messages at the update probability of 95%; and S5: establishing a static optimization model, and determining an optimization objective function of space-based ADS-B digital multi-beamforming under the condition that amplitude and phase constraints of a digital beam weight vector and a full-coverage constraint within a given half angle of the satellite are satisfied:

$$J_{extend} = \min_{\Omega}(\Delta t_{95\%} + \delta \hat{g}_c(\Omega)),$$

in which $\delta$ represents a full-coverage penalty factor within a given half angle of the satellite, $\hat{g}_c(\Omega)$ represents the full-coverage constraint within the given half angle of the satellite, and $\Omega$ represents a vector of $2N_E \times N_b$ dimensions.

Further, in S1, calculating the signal-to-noise ratio for each aircraft in each beam includes the steps of:

A1: determining received signals of array antennas of the satellite by means of a formula below:

$$y = \sum_{k \in \Theta} \sqrt{p_k} h_k S_k + n,$$

in which $h_k \in \mathbb{C}^{N_E \times 1}$ represents a channel state from an aircraft k to the satellite, $N_E$ represents a number of array elements, $\Theta$ represents a set of all aircraft in the satellite coverage area, $p_k$ represents a transmit power of the aircraft k, $n \sim CN(0, \sigma^2 I)$ represents a noise vector of the received signals, and $S_z$ represents a broadcast power-normalized signal;

A2: establishing a weight matrix W for space-based ADS-B multibeam reception:

$$W \triangleq [W_1, W_2, \ldots, W_{N_b}] = \begin{bmatrix} W_{1,1} & W_{1,2} & \ldots & W_{1,N_b} \\ W_{2,1} & W_{2,2} & \ldots & W_{2,N_b} \\ \vdots & \vdots & \ddots & \vdots \\ W_{N_E,1} & W_{N_E,2} & \ldots & W_{N_E,N_b} \end{bmatrix},$$

in which $N_E$ represents a number of array elements, with $N_E = N_1 \times N_2$, $N_1$ and $N_2$ represent rows- and columns of the array antennas, respectively, and $N_b$ represents a number of digital beamforming vectors;

A3: combining the received signals of the satellite array antenna through a weight vector $W_n = [W_{1,n}, W_{2,n}, \ldots W_{N_E,n}]^T$, and demodulating and decoding signals of the aircraft k, wherein a signal output after digital multi-beamforming is:

$$\hat{s}_k = w_n^T y = \underbrace{\sqrt{P_k} w_n^T h_k s_k}_{(a)} + \underbrace{w_n^T \sum_{k' \in \Theta, k' \neq k} \sqrt{P_{k'}} h_{k'} s_{k'}}_{(b)} + \underbrace{w_n^T n}_{(c)},$$

in which (a) represents a useful signal received from the aircraft k, (b) represents the interference signals from other aircraft, and (c) represents the noise; and A4: assuming the noise and the useful signal remain independent, determining a signal-to-noise ratio $\xi_k$ of the useful signal received by the satellite from the aircraft k:

$$\xi_i = \frac{E[P_k|w_n^T h_k s_k|^2]}{E[w_n^T n]} = \frac{P_k|w_n^T h_k|^2}{\varpi \sigma^2 \|w_n\|^2}.$$

in which $\sigma^2$ represents a noise power, $\overline{\omega}$ represents a noise figure, and E represents a mean square value.

Further, in A1, a channel from the aircraft to the satellite satisfies a free-space loss model, the transmitting antenna of the aircraft is an omnidirectional antenna, the reception antenna of the satellite is a directional antenna, and the channel state $h_k$ from the aircraft k to the satellite is determined by means of a formula below:

$$h_k = \sqrt{g_k} f(\theta_k, \phi_k) a_k,$$

in which $g_k$ represents a path loss acquired according to a relative spatial position from the aircraft k to the satellite and a communication frequency; $f(\theta_k,\phi_k)$ represents the array element pattern, indicating an amplitude gain of an array element in an incident direction; and $a_k$ represents an array steering vector.

Further, when radio signals from the aircraft k are incident towards a direction of the satellite, the array steering vector $a_k$ is determined by means of a formula below:

$$a_k = \left[ e^{j2\pi P_{AS,k}^T \frac{v_1}{\lambda \|P_{AS,k}\|}}, \ldots, e^{j2\pi P_{AS,k}^T \frac{v_{NE}}{\lambda \|P_{AS,k}\|}} \right]^T,$$

in which $P_{AS}$, k represents a relative position vector from the aircraft to the satellite, $\lambda$–vc/fc represents a wavelength of a radio frequency used, vc represents a radio wave propagation velocity of $3 \times 10^8$ m/s, and fc represents a center frequency of 1090 MHz for an ADS-B signal.

Further, in S2, analyzing the correct decoding probability of signals includes the steps of:

C1: the ADS-B signals use binary Pulse Position Modulation (PPM) encoding, and the bit error rate $P_{ber}$ can be calculated by means of a formula below:

$$P_{ber} = \int_{\sqrt{\xi_k}}^{+\infty} \frac{1}{\sqrt{2\pi}} e^{\left(\frac{t^2}{2}\right)} dt = Q(\sqrt{\xi_k}),$$

in which the function Q represents a complementary cumulative distribution function of a standard normal distribution, and t represents time;

C2: when the number of bit errors in the ADS-B signal is smaller than or equal to 5, the ADS-B signals can be decoded correctly, wherein the correct decoding probability $P_d$ of the ADS-B signal is:

$$P_d = \sum_{n=1}^{5} C_{112}^n P_{ber}^n (1 - P_{ber})^{112-n};$$

C3: when a digital beamforming vector W is used for spatial filtering, combining the signals of the aircraft k to acquire a signal-to-noise ratio vector $\xi_k = [\xi_{k,1}, \xi_{k,2}, \ldots \xi_{k,N_b}]^T$, wherein each component is the signal-to-noise ratio of the signal of the aircraft k in each beam, thereby obtaining a probability $P_{a,k}$ that the signals of aircraft k will be correctly decoded in each beam without signal collision, under different signal-to-noise ratios, $$P_{d,k} = [P_{d,k,1}, P_{d,k,2}, \ldots P_{d,k,N_b}]^T,$$

in which the aircraft k is covered by the $i^{th}$ beam, $i \in [1, N^b]$.

Further, in S2, analyzing the signal collision probability includes the steps of:

D1: calculating, according to the signal-to-noise ratios of the signals transmitted by each aircraft to the satellite, the number of aircraft that will cause co-channel interference to the aircraft k in the $i^{th}$ beam;

D2: given a proportion of aircraft equipped with transponders with different modes, the emission rate of each transponder, and the signal length, calculating a probability $P_{B,k,i}(m,t)$ that m ADS-B signals arrive at the satellite from the $i^{th}$ beam during time t, a probability $P_{A,k,i}(m,t)$ that m Mode A/C signals arrive at the satellite from the $i^{th}$ beam during time t, and a probability $P_{S,k,i}(m,t)$ that m Mode S signals arrive at the satellite from the $i^{th}$ beam during time t, as follows:

$$\begin{cases} P_{B,k,i}(m,t) = \dfrac{(\lambda_{B,k,i} t)^m}{m!} e^{-\lambda_{B,k,i} t} \\ P_{A,k,i}(m,t) = \dfrac{(\lambda_{A,k,i} t)^m}{m!} e^{-\lambda_{A,k,i} t}, \\ P_{S,k,i}(m,t) = \dfrac{(\lambda_{S,k,i} t)^m}{m!} e^{-\lambda_{S,k,i} t} \end{cases}$$

in which $\lambda_{B,k,i}$ represents the rate at which the interfering ADS-B signals in the $i^{th}$ beam reach the satellite, $\lambda_{A,k,i}$ represents the rate at which the interfering Mode A/C signals in the $i^{th}$ beam reach the satellite, and $\lambda_{S,k,i}$ represents the rate at which the interfering Mode S signals in the $i^{th}$ beam reach the satellite; and D3: deriving a probability $P_{BC,k,i}(\eta_B, \eta_A, \eta_S)$ that one ADS-B signal from aircraft k in the $i^{th}$ beam collide with $\eta_B$ other ADS-B signals, $\eta_A$ other Mode A/C signals, and $\eta_S$ other Mode S signals as follows:

$$P_{BC,k,i}(\eta_B, \eta_A, \eta_S) = P_{B,k,i}(\eta_B, 2\tau_B) P_{A,k,i}(\eta_A, \tau_B + \tau_A) P_{S,k,i}(\eta_S, \tau_B + \tau_S),$$

in which $\tau_B$, $\tau_A$ and $\tau_S$ represent a duration of a single ADS-B signal, a duration of a single Mode A/C signal, and a duration of a single Mode S signal, respectively, which are 120 us, 21 us, and 64 us, respectively.

Further, calculating the correct reception probability of the ADS-B signals by the satellite with different SNRs and with different number of aircraft comprises the steps of:

E1: suggest that the reception of the ADS-B signals does not allow collision with other ADS-B signals or Mode S signals, then the correct reception probability of the ADS-B signals after the ADS-B signals collide with other ADS-B signals or Mode S signals is 0. For the Mode A/C signals, the minimum reception probability of the ADS-B receiver for the case of interleaving 0 to 3 Mode A/C signals is specified by the standard:

$$P_{RA,k,i}(\eta_A) = \begin{cases} P_{d,k,i}, & \eta_A = 0 \\ 0.89 P_{d,k,i}, & \eta_A = 1 \\ 0.64 P_{d,k,i}, & \eta_A = 2, \\ 0.52 P_{d,k,i}, & \eta_A = 3 \\ 0, & \eta_A \geq 4 \end{cases}$$

in which $P_{d,k,i}$ represents a probability that an ADS-B signal of the aircraft k is correctly received by the $i^{th}$ beam in a "clear" environment (without in which co-channel interference from other aircrafts is absent;

E2: calculating a probability $P_{rb_i,k}$ that the ADS-B signals of the aircraft k are correctly received in the $i^{th}$ beam:

$$P_{rb_i,k} = \Sigma_{\eta=0}^{\infty} P_{RA,k,i}(\eta) P_{BC,k,i}(0,\eta,0),$$

in which $P_{RA,k,i}$ represents the reception probability of the signal from aircraft k in the $i^{th}$ beam, $P_{BC,k,i}$ represents the collision probability that one ADS-B signal from aircraft k collides with $\eta_B$ other ADS-B signals, $\eta_A$ Mode A/C signals, and $\eta_S$ Mode S signals in the $i^{th}$ beam, and $(0, \eta, 0)$ indicates collision with only $\eta$ Mode A/C signals; and E3: when the aircraft k is covered by n out of all the $N_b$ beams, calculating the correct reception probability $P_{r,k}$ of the $k^{th}$ aircraft's ADSB signal as follows:

$$P_{r,k} = \sum_{i=0}^{n} P_{rb_i,k} - \sum_{1 \leq i \leq j \leq n} P_{r(b_i \cup b_j),k} + \sum_{1 \leq i \leq j \leq k \leq n} P_{r(b_i \cup b_j \cup b_k),k} + \dots + (-1)^{n-1} P_{r(\cup_{i=1}^{n} b_i),k},$$

in which $b_i$, $b_j$, and $b_k$ represent the $i^{th}$, $j^{th}$, and $k^{th}$ beams covering the aircraft k, respectively.

Further, in S4, determining the update interval of position messages at the update probability of 95% comprises the steps of:

F1: calculating a probability distribution $P_{t,k}(\Delta t)$ of the update interval of position messages of the aircraft k:

$$P_{t,k}(\Delta t) = P_{r,k}(1 - P_{r,k})^{\left|\frac{\Delta t}{T}\right|-1},$$

in which T represents a time interval for the aircraft to send an ADS-B position message, wherein a probability corresponding to a time interval $\Delta t$ between a time at which next position message of the aircraft k is correctly received by the ADS-B satellite and to can be expressed as:

$$\Delta t = \begin{cases} T & P_{r,k} \\ 2T & P_{r,k}(1-P_{r,k}) \\ \vdots \\ nT & P_{r,k}(1-P_{r,k})^{n-1} \end{cases};$$

F2: calculating a cumulative probability distribution $\Psi_{t,k}(\Delta t)$ of the update interval of position messages of the aircraft k as follows:

$$\Psi_{t,k}(\Delta t) = 1 - (1 - P_{r,k})^{\left|\frac{\Delta t}{T}\right|};$$

F3: calculating the probability distribution $P_t(\Delta t)$ of an average update interval of position messages of all the aircraft as follows:

$$P_t(\Delta t) = \frac{1}{N} \sum_{k=1}^{N} P_{r,k}(1 - P_{r,k})^{\left|\frac{\Delta t}{T}\right|-1};$$

F4: calculating the cumulative probability distribution $\Psi_t(\Delta t)$ of an average update interval of position messages of all the aircraft:

$$\Psi_t(\Delta t) = 1 - \frac{1}{N} \sum_{k=1}^{N} P_{r,k}(1 - P_{r,k})^{\left|\frac{\Delta t}{T}\right|},$$

in which N represents a total number of aircraft covered by ADS-B satellite; and F5: verifying, by means of a formula below, the update interval of position messages at the update probability of 95% with respect to air traffic control surveillance performance requirements:

$$\Delta t_{95\%} = \Psi_t^{-1}(95\%).$$

Further, in S5, the full-coverage constraint $\hat{g}_c(\Omega)$ within the given half angle of the satellite is verified by means of a formula below:

$$\hat{g}_c(\Omega) = \sum_{i=1}^{359} \sum_{j=1}^{\lfloor el_0 \rfloor + 2} C_{i,j} = 0,$$

in which C represents a coverage constraint matrix of $360 \times (\lfloor el_0 \rfloor + 1)$ dimensions, $C_{i,j}$ represents an element of the $i^{th}$ row and the $j^{th}$ column in the full coverage matrix C, $el_0$ represents a half angle that the satellite needs to cover, and $\Omega$ represents a vector of $2N_k \times N_b$ dimensions.

Further, a single-point coverage function in the coverage constraint matrix is expressed as:

$$C(az, el) = \begin{cases} 0, & \text{if } \exists\, i \in [1, N_b], P_{d,i}(az, el) \geq 90\% \\ 1, & \text{if } \forall\, i \in [1, N_b], P_{d,i}(az, el) < 90\% \end{cases},$$

in which $P_{d,i}$ (az,el) represents the correct decoding probability of the ADS-B signal broadcast at the corresponding position in the $i^{th}$ beam under the condition of no co-channel interference, el represents an elevation angle of radio waves incident to the ADS-B antenna array at any point C on the earth surface within the half angle covered by the satellite, and az represents an azimuth angle of the radio waves incident to the ADS-B antenna array.

The present invention has the following advantageous effects. which Mode A/C signals, Mode S signals, and ADS-B signals that cause co-channel interference in each beam for each aircraft reach the satellite;

S3: calculating correct reception probability of the ADS-B signals by the satellite with different signal-to-noise ratios and with different number of aircraft;

S4: determining the update interval of position messages at the update probability of 95%; and S5: establishing a static optimization model, and determining an optimization objective function of space-based ADS-B digital multi-beamforming under the condition that amplitude and phase constraints of a digital beam weight vector and a full-coverage constraint within a given half angle of the satellite are satisfied:

$$J_{extend} = \min_{\Omega}(\Delta t_{95\%} + \delta \hat{g}_c(\Omega)),$$

in which $\delta$ represents a full-coverage penalty factor within a given half angle of the satellite, $\hat{g}_c(\Omega)$ represents the full-coverage constraint within the given half angle of the satellite, and $\Omega$ represents a vector of $2N_E \times N_b$ dimensions.

EMBODIMENT

In step 1, an on-board ADS-B Out transmitter of an aircraft k broadcasts ADS-B signals to free space by using an omnidirectional antenna, and signals Y received by array antennas of a satellite are:

$$y = \sum_{k \in \Theta} \sqrt{p_k} h_k s_k + n.$$

In the formula, $h_k \in \mathbb{C}^{N_E \times 1}$ represents a channel state from an aircraft k to the satellite; $N_E$ represents a number of array elements; $\Theta$ represents a set of all aircraft in the satellite coverage area; $p_k$ represents the transmit power of the aircraft k; $n \sim CN(0, \sigma^2 I)$ represents a noise vector of the received signals; I represents a unit matrix; $\sim CN(\ )$ represents the compliance with a complex Gaussian distribution; and each element in n conforms to the distribution where a mean value is 0 and a variance is $\sigma^2$.

Antennas carried by an ADS-B satellite are in a rectangular uniform planar array; the number of array elements is $N_E = N_1 \times N_2$; and $N_1$ and $N_2$ are the rows and columns of the array antennas, respectively; and a weight matrix W for space-based ADS-B multibeam reception is established as follows, which contains $N_b$ digital reception beamforming vectors:

$$W \triangleq [W_1, W_2, \ldots, W_{N_b}] = \begin{bmatrix} W_{1,1} & W_{1,2} & \cdots & W_{1,N_b} \\ W_{2,1} & W_{2,2} & \cdots & W_{2,N_b} \\ \vdots & \vdots & \ddots & \vdots \\ W_{N_E,1} & W_{N_E,2} & \cdots & W_{N_E,N_b} \end{bmatrix},$$

When the satellite combines the received signals through a weight vector $Wn = [W_{1,n}, W_{2,n}, \ldots W_{N_E,n}]^T$ and demodulates and decodes the signals of the aircraft k, a signal output after digital multi-beamforming is written as:

$$\hat{s}_k = w_n^T y = \underbrace{\sqrt{P_k} w_n^T h_k s_k}_{(a)} + \underbrace{w_n^T \sum_{k' \in \Theta, k' \neq k} \sqrt{P_{k'}} h_{k'} s_{k'}}_{(b)} + \underbrace{w_n^T n}_{(c)}.$$

In the formula, (a) represents a useful signal received from the aircraft k; (b) represents the interference signals from other aircraft, and (c) represents the noise. If the noise and the useful signal remain independent, the signal-to-noise ratio $\xi_k$ of the useful signal, received by the satellite, from the aircraft k is expressed as:

$$\xi_k = \frac{E\left[P_k |w_n^T h_k s_k|^2\right]}{E\left[w_n^T n\right]} = \frac{P_k |w_n^T h_k|^2}{\varpi \sigma^2 \|w_n\|^2}.$$

In the formula, $\sigma^2$ represents a noise power, u represents a noise figure, and E represents a mean square value.

A channel from the aircraft to the satellite satisfies a free-space loss model, the transmitting antenna of the aircraft is an omnidirectional antenna, and the reception antenna of the satellite is a directional antenna. Then, the channel state $h_k$ from the aircraft k to the satellite is:

$$h_k = \sqrt{g_k} f(\theta_k, \phi_k) a_k,$$

In the formula, $g_k$ represents a path loss obtained according to a relative spatial position from the aircraft k to the satellite and a communication frequency; $f(\theta_k, \phi_k)$ represents the array element pattern, indicating an amplitude gain of an array element in an incident direction; and $a_k$ represents an array steering vector.

For the array steering vector, as shown in FIG. 1, a relative position vector from an array element 1 to an array element 2 in the array antennas is denoted as $\bar{v}$, and a relative position vector from the array element 1 to an array element $N_1+1$ is denoted as $\hat{v}$. Here, $\bar{v}$ is parallel to a tangent direction of a latitudinal line of a sub-satellite point, and $\hat{v}$ is parallel to a tangent direction of a longitudinal line of the sub-satellite point. Then, $$\begin{cases} \bar{v} = d_E[]\sin(B_S)\cos(L_S), |\sin(B_S)|\sin(L_S), -\sign(O)\cos(B_S)]^T \\ \hat{v} = d_E[\cos(90+L_S), \sin(90+L_S), 0]^T \end{cases}.$$

In the formula, $d_E$ represents a distance between two adjacent array elements in the same row or column, and O represents that the satellite is in an ascending orbit operation period or a descending orbit operation period; and h-s represents a longitude at which the satellite is running currently, and $B_B$ represents a latitude at which the satellite is running currently.

Then, the relative position vector from the array element 1 to the array element m can be written as:

$$v_m = (m-1)\% N_1 \bar{v} + \lfloor (m-1)/N_1 \rfloor \hat{v}, m \in [1, N_E].$$

In the formula, % represents an operator for a remainder operation, and $\lfloor \cdot \rfloor$ represents an operator for the rounding down operation.

Then, when a radio signal of the aircraft k is incident in the direction of the satellite, the steering vector of the array antennas can be written as:

$$a_k = \left[ e^{j2\pi P_{AS,k}^T \frac{v_1}{\lambda \|P_{AS,k}\|}}, \ldots, e^{j2\pi P_{AS,k}^T \frac{v_{NE}}{\lambda \|P_{AS,k}\|}} \right]^T.$$

In the formula, $P_{AS,k}$ represents a relative position vector from the aircraft to the satellite; $\lambda = vc/fc$ represents a wavelength of a radio frequency used; vc represents a radio wave propagation velocity of $3\times 10^8$ m/s; and fc represents a center frequency of 1090 MHz for an ADS-B signal.

The channel state between the aircraft k and the ADS-B satellite may be obtained by substituting the steering vector, the path loss and the directional map of array elements of the array antenna into the calculation of the channel state.

When the aircraft transmit power, the noise power of the space-based ADS-B receiver, and the digital beamforming vector are determined, the signal-to-noise ratio $\xi_k$ of the received signal is in turn obtained.

In step 2, analysis is performed according to the obtained signal-to-noise ratio of the received signal, to obtain a correct signal decoding probability and a signal collision probability.

The ADS-B signals use binary Pulse Position Modulation (PPM) encoding; and when the satellite receives the signals of the aircraft k and the signal-to-noise ratio is $\xi_k$, the bit error rate during decoding is calculated by means of a formula below:

$$P_{ber} = \int_{\sqrt{\xi_k}}^{+\infty} \frac{1}{\sqrt{2\pi}} e^{\left(-\frac{t^2}{2}\right)} dt = Q(\sqrt{\xi_k}).$$

In the formula, the function Q represents a complementary cumulative distribution function of a standard normal distribution, and t represents time.

When the number of bit errors in the ADS-B signal is smaller than or equal to 5, the ADS-B signal can be decoded correctly, and the correct decoding probability of the ADS-B signal is expressed as:

$$P_d = \sum_{n=1}^{5} C_{112}^n P_{ber}^n (1 - P_{ber})^{112-n}.$$

When a digital beamforming vector w is used for spatial filtering, the signals of the aircraft k are combined to obtain a signal-to-noise ratio vector $\xi_k = [\xi_{k,1}, \xi_{k,2}, \ldots \xi_{k,N_b}]^T$. Here, each component is the signal-to-noise ratio of the signal of the aircraft k in each beam, thereby obtaining a probability that the signals of the aircraft k will be correctly decoded in each beam, under different signal-to-noise ratios:

$$P_{d,k} = [P_{d,k,1}, P_{d,k,2}, \ldots P_{d,k,N_b}]^T,$$

When the signal collision probability is analyzed, assuming the aircraft k is covered by the $i^{th}$ beam, $i \in [1, N_b]$, the number of aircraft that will cause co-channel interference to the aircraft k in the $i^{th}$ beam is calculated according to the signal-to-noise ratios of the signals that are emitted by each aircraft to the satellite. Given a proportion of aircraft equipped with transponders with different modes, the emission rate of each transponder, and the signal length, a probability $P_{B,k,i}(m,t)$ that m ADS-B signals arrive at the satellite from the $i^{th}$ beam during time. t is calculated as follows:

$$P_{B,k,i}(m, t) = \frac{(\lambda_{B,k,i} t)^m}{m!} e^{-\lambda_{B,k,i} t}.$$

In the formula, $\lambda_{B,k,i}$ represents the rate at which the interfering ADS-B signals in the $i^{th}$ beam reach the satellite. Similarly, the probability $P_{A,k,i}(m,t)$ that m Mode A/C signals arrive at the satellite from. the $i^{th}$ beam during time t and the probability $P_{S,k,i}(m,t)$ that m Mode S signals arrive at the satellite from the if beam during time t are obtained as follows:

$$\begin{cases} P_{A,k,i}(m, t) = \frac{(\lambda_{A,k,i} t)^m}{m!} e^{-\lambda_{A,k,i} t} \\ P_{S,k,i}(m, t) = \frac{(\lambda_{S,k,i} t)^m}{m!} e^{-\lambda_{S,k,i} t} \end{cases}.$$

In the formula, $\lambda_{A,k,i}$ represents the rate at which the interfering Mode A/C signals in the $i^{th}$ beam reach the satellite, and $\lambda_{S,k,i}$ represents the rate at which the interfering Mode S signals in the $i^{th}$ beam reach the satellite.

In turn, a probability $P_{BC,k,i}$ that one ADS-B signal from aircraft k in the $i^{th}$ beam collide with $\eta_B$ other ADS-B signals, $\eta_A$ other Mode A/C signals, and $\eta_S$ other Mode S signals is obtained as follows:

$$P_{BC,k,i}(\eta_B, \eta_A, \eta_S) = P_{B,k,i}(\eta_B, 2\tau_B) P_{A,k,i}(\eta_A, \tau_B + \tau_A) P_{S,k,i}(\eta_s, \tau_B + \tau_S).$$

In the formula, $\tau_B$, $\tau_A$ and $\tau_S$ represent a duration of a single ADS-B signal, a duration of a single Mode A/C signal, and a duration of a single Mode S signal, respectively, which are 120 us, 21 us, and 64 us, respectively.

In step 3, on the basis of obtaining correct decoding probability and collision probability, the correct reception probability of a single ADS-B signal in a single beam and in multiple beams of a single satellite are calculated.

Suggest that the reception of the ADS-B signal does not allow collision with other ADS-B signals or Mode S signals, the correct reception probability of the ADS-B signals after the ADS-B signals collide with other ADS-B signals or Mode S signals is 0. For the Mode A/C signals, the minimum reception probability of the ADS-B receiver for the case of interleaving 0 to 3 Mode A/C signals is specified by the standard:

$$P_{RA,k,i}(\eta_A) = \begin{cases} P_{d,k,i}, & \eta_A = 0 \\ 0.89 P_{d,k,i}, & \eta_A = 1 \\ 0.64 P_{d,k,i}, & \eta_A = 2 \\ 0.52 P_{d,k,i}, & \eta_A = 3 \\ 0, & \eta_A \geq 4 \end{cases}$$

In the formula, $P_{d,k,i}$ represents a probability that an ADS-B signal of the aircraft k is correctly received by the $i^{th}$ beam in a "clear" environment in which co-channel interference from other aircrafts is absent.

Therefore, a probability $P_{rb_i,k}$ that the ADS-B signals of the aircraft k are correctly received in the $i^{th}$ beam is:

$$P_{rb_i,k} = \Sigma_{\eta=0}^{\infty} P_{RA,k,i}(n) P_{BC,k,i}(0,\eta,0).$$

In the formula, $P_{RA,k,i}$ represents the reception probability of the signal from the aircraft k in the $i^{th}$ beam, $P_{BC,k,i}$ represents the collision probability that one ADS-B signal from aircraft k collides with $\eta_B$ other ADS-B signals, $\eta_A$ other Mode A/C signals, and $\eta_S$ other Mode S signals; and (0, $\eta$, 0) indicates collision with only $\eta$ Mode A/C signals.

When the aircraft k is covered by n out of all the $N_b$ beams, the correct reception probability $P_{r,k}$ of the $k^{th}$ aircraft's ADS-B signals may be obtained as follows:

$$P_{r,k} = \sum_{i=0}^{n} P_{rb_i,k} - \sum_{1 \leq i \leq j \leq n}^{n} P_{r(b_i \cup b_j),k} +$$

-continued $$\sum_{1 \leq i < j < k \leq n}^{n} P_{r(b_i \cup b_j \cup b_k),k} + \cdots + (-1)^{n-1} P_{r(\cup_{i=1}^{n} b_i),k}.$$

In the formula, $b_i$, $b_j$, and $b_k$ represent the $i^{th}$, $j^{th}$ and $k^{th}$ beams covering the aircraft k, respectively.

In step 4, the update interval and the update probability of the position messages are determined for the ADS-B surveillance system.

If the ADS-B satellite correctly receives the position messages of the aircraft k at a time $t_0$, and a time interval for the aircraft to send an ADS-B position message is T, a probability corresponding to a time interval $\Delta t$ between a time at which next position message of the aircraft k is correctly received by the ADS-B satellite and $t_0$ may be then expressed as:

$$\Delta t = \begin{cases} T & P_{r,k} \\ 2T & P_{r,k}(1 - P_{r,k}) \\ \vdots \\ nT & P_{r,k}(1 - P_{r,k})^{n-1} \end{cases}.$$

Therefore; the probability distribution $P_{t,k}$ ($\Delta t$) of the update interval of position messages of the aircraft k may be expressed as:

$$P_{t,k}(\Delta t) = P_{r,k}(1 - P_{r,k})^{\lfloor \frac{\Delta t}{T} \rfloor - 1}.$$

According to a geometric progression summation formula, the cumulative probability distribution $\Psi_{t,k}(\Delta t)$ of the update interval of position messages of the aircraft k may be further inferred as follows:

$$\Psi_{t,k}(\Delta t) = 1 - (1 - P_{r,k})^{\lfloor \frac{\Delta t}{T} \rfloor}.$$

If the total number of aircraft covered by the ADS-B satellite is N, the probability distribution $P_t(\Delta t)$ of an average update interval of position messages of all the aircraft within the coverage range of the ADS-B satellite is:

$$P_t(\Delta t) = \frac{1}{N} \sum_{k=1}^{N} P_{r,k}(1 - P_{r,k})^{\lfloor \frac{\Delta t}{T} \rfloor - 1}.$$

Accordingly, the cumulative probability distribution $\Psi_t(\Delta t)$ of an average update interval of position messages of all the aircraft within the coverage range of the ADS-B satellite may be obtained as:

$$\Psi_t(\Delta t) = 1 - \frac{1}{N} \sum_{k=1}^{N} P_{r,k}(1 - P_{r,k})^{\lfloor \frac{\Delta t}{T} \rfloor}.$$

Therefore, the update interval of position messages at the update probability of 95% with respect to air traffic control surveillance performance requirements may be expressed as:

$$\Delta t_{95\%} = \Psi_t^{-1}(95\%).$$

In step 5, the digital multi-beamforming for space-based ADS-B may be converted into static optimization, in order to establish a static optimization model as follows:

$$J = \min_W (\Delta t_{95\%}).$$

It is necessary to satisfy amplitude and phase constraints of a digital beam weight vector and a full-coverage constraint within a given half angle of the satellite. A weight vector element $w_{ij}$ of the $j^{th}$ array element in the $i^{th}$ beam may be expressed in an amplitude and phase form $A_{j,i}e^{j\varphi_{ji}}$. Here, $A_{j,i}$ represents an amplitude excitation of the $j^{th}$ array element in the $i^{th}$ beam, with $A_{min} \leq A_{j,i} \leq A_{max}$; and $\varphi_{j,i}$ represents a phase excitation of the $j^{th}$ array element in the $i^{th}$ beam, with $\varphi_{min} \leq \varphi_{j,i} \leq \varphi_{max}$. The above variable parameters are optimized by means of the static optimization model. Then, the digital reception beamforming vector W may be rewritten as:

$$W = \begin{bmatrix} A_{1,1}e^{j\varphi_{1,1}} & A_{1,2}e^{j\varphi_{1,2}} & \cdots & A_{1,N_b}e^{j\varphi_{1,N_b}} \\ A_{2,1}e^{j\varphi_{2,1}} & A_{2,2}e^{j\varphi_{2,2}} & \cdots & A_{2,N_b}e^{j\varphi_{2,N_b}} \\ \vdots & \vdots & \ddots & \vdots \\ A_{N_E,1}e^{j\varphi_{N_E,1}} & A_{N_E,2}e^{j\varphi_{N_E,2}} & \cdots & A_{N_E,N_b}e^{j\varphi_{N_E,N_b}} \end{bmatrix}.$$

Then, the parameters to be optimized of digital multi-beamforming problem for space-based ADS-B may be expressed as-the following vector of $2N_E \times N_b$ dimensions:

$$\Omega = \begin{bmatrix} A_{1,1} & A_{1,2} & \cdots & A_{1,N_b} \\ \varphi_{1,1} & \varphi_{1,2} & \cdots & \varphi_{1,N_b} \\ \vdots & \vdots & \ddots & \vdots \\ A_{N_E,1} & A_{N_E,2} & \cdots & A_{N_E,N_b} \\ \varphi_{N_E,1} & \varphi_{N_E,2} & \cdots & \varphi_{N_E,N_b} \end{bmatrix}.$$

For any point C on the earth surface within the half angle covered by the satellite, assuming that the elevation angle of radio waves, at this point, incident to the ADS-B antenna array is el, and the azimuth angle of the radio waves incident to the ADS-B antenna array is az, a single-point coverage function is then defined as follows:

$$c(az, el) = \begin{cases} 0, & \text{if } \exists i \in [1, N_b], P_{d,i}(az, el) \geq 90\% \\ 1, & \text{if } \forall i \in [1, N_b], P_{d,i}(az, el) < 90\% \end{cases}.$$

Here, $P_{d,i}(az,el)$ represents the correct decoding probability of the ADS-B signal broadcast at the corresponding position in the $i^{th}$ beam under the condition of no co-channel interference.

Assuming a half angle that the satellite needs to cover is $el_c$, a coverage constraint matrix of $360 \times (\lfloor el_0 \rfloor + 1)$ dimensions is defined as follows:

$$C = \begin{bmatrix} c(-180,-90), & c(-180,-89), & \ldots, & c(-180,\lfloor el_0 \rfloor -90), & c(-180, el_0 -90) \\ & \ddots & & & \\ & & c(az, el) & & \\ & & & \ddots & \\ c(179,-90), & c(179,-89), & \ldots, & c(179,\lfloor el_0 \rfloor -90), & c(179, el_0 -90) \end{bmatrix}.$$

If the range of a half angle $el_0$ required is fully covered by the satellite, the value of each element in C is 0; and if an orientation within the range of the half angle $el_0$ is not covered, the value of the element in C corresponding to the orientation is 1. Then, the full coverage constraint within the given half angle of the satellite is calculated by means of the following formula:

$$\hat{g}_c(\Omega) = \sum_{i=1}^{359} \sum_{j=1}^{\lfloor el_0 \rfloor + 2} C_{i,j} = 0.$$

In the formula, $C_{i,j}$ represents an element of the $i^{th}$ row and the $j^{th}$ column in the full coverage matrix C.

Finally, the digital multi-beamforming optimization objective function for space-based ADS-B may be expressed as:

$$J_{extend} = \min_{\Omega}(\Delta t_{95\%} + \delta \hat{g}_c(\Omega)).$$

Here, $\delta$ represents a full coverage penalty factor within the given half angle of the satellite. In the case that $\delta$ is a large enough positive integer, $l_{extend}$ will obtain a very large value when $N_b$ beams fail to achieve full coverage within the given half angle; and on the contrary, the value of $\delta \hat{g}_e(\Omega)$ may be replaced by 0 when an optimization result satisfies the full coverage constraint within the given half angle.

The above technical solutions have the following beneficial effects. According to the present invention, the signal-to-noise ratios of received signals are calculated based on an ADS-B signal model and an air-space channel model; the correct reception probability of ADS-B signals by a satellite with different signal-to-noise ratios and with different numbers of aircraft are derived on the basis of analyzing a correct decoding probability and a collision probability; and in the case that the constraint of a satellite coverage metric is satisfied, aiming at minimizing the update interval of position messages at the update probability of 95%, a digital multi-beamforming optimization model for space-based ADS-B is established. The present invention considers the coverage of all beams of a satellite, and can effectively achieve the complete coverage of a coverage range required by an ADS-B satellite; and at the same time, the present invention considers the effects of the correct reception probability of signals with different signal-to-noise ratios, which is closer to an actual situation. Compared with the multi-beamforming method for space-based ADS-B that does not consider the coverage constraint, the present invention has a better update interval.

Finally, it is noted that the above preferred embodiments are used only to illustrate rather than limiting the technical solutions of the present invention. Although the present invention has been described in detail by the above preferred embodiments, it should be understood by those skilled in the art that various changes can be made to the present invention in form and in detail without deviating from the scope defined by the claims of the present invention.

What is claimed is:

1. A multi-beamforming optimization method for space-based Automatic Dependent Surveillance-Broadcast (ADS-B) based on a coverage matrix, comprising the steps of:
   S1: establishing a digital multibeam reception scenario for space-based ADS-B signals, determining a position of an ADS-B satellite and a distribution condition of aircraft under the coverage of the satellite, and calculating a signal-to-noise ratio for each aircraft in each beam according to a digital beamforming vector;
   S2: performing analysis according to signal-to-noise ratio of received signal to obtain a correct decoding probability of the signal and a signal collision probability, as well as a rate at which Mode A/C signals, Mode Select ("Mode S") signals, and ADS-B signals that cause co-channel interference in each beam for each aircraft reach the satellite;
   S3: calculating a correct reception probability of the ADS-B signals by the satellite with different signal-to-noise ratios and with different number of aircraft;
   S4: determining an update interval of position messages at an update probability of 95%; and
   S5: establishing a static optimization model, and determining an optimization objective function of space-based ADS-B digital multi-beamforming under the condition that amplitude and phase constraints of a digital beam weight vector and a full-coverage constraint within a given half angle of the satellite are satisfied:

$$J_{extend} = \min_{\Omega}(\Delta t_{95\%} + \delta \hat{g}_c(\Omega)),$$

in which $\delta$ represents a full-coverage penalty factor within a given half angle of the satellite, $\hat{g}_c(n)$ represents the full-coverage constraint within the given half angle of the satellite, and $\Omega$ represents a vector of $2N_E*N_b$ dimensions.

2. The multi-beamforming optimization method for space-based ADS-B based on a coverage matrix according to claim 1, wherein in S1, calculating the signal-to-noise ratio in each aircraft under each beam comprises the steps of:
   A1: determining received signals of array antennas of the satellite by means of a formula below:

$$y = \sum_{k \in \Theta} \sqrt{p_k} h_k s_k + n,$$

in which $h_k \in \mathbb{C}^{N_E \times 1}$ represents a channel state from an aircraft k to the satellite, $N_E$ represents a number of array elements, $\Theta$ represents a set of all aircraft in the satellite coverage area $p_k$ represents a transmit power of the aircraft k, n~CN(0,σ²I) represents a noise vector of the received signal, and $S_k$ represents a broadcast power-normalized signal;

A2: establishing a weight matrix W for space-based ADS-B multibeam reception:

$$W \triangleq [W_1, W_2, \ldots, W_{N_b}] = \begin{bmatrix} W_{1,1} & W_{1,2} & \cdots & W_{1,N_b} \\ W_{2,1} & W_{2,2} & \cdots & W_{2,N_b} \\ \vdots & \vdots & \ddots & \vdots \\ W_{N_E,1} & W_{N_E,2} & \cdots & W_{N_E,N_b} \end{bmatrix},$$

in which $N_E$ represents a number of array elements, with $N_E = N_1 * N_2$, $N_1$ and $N_2$ represent rows and columns of the array antennas, respectively, and $N_b$ represents a number of digital beamforming vectors;

A3: combining the received signals of the satellite array antenna through a weight vector $W_n = [W_{1,n}, W_{2,n}, \ldots, W_{N_E,n}]^T$, and demodulating and decoding signals of the aircraft k, wherein a signal output after digital multi-beamforming is:

$$\hat{s}_k = w_n^T y = \underbrace{\sqrt{P_k} w_n^T h_k s_k}_{(a)} + \underbrace{w_n^T \sum_{k' \in \Theta, k' \neq k} \sqrt{P_{k'}} h_{k'} s_{k'}}_{(b)} + \underbrace{w_n^T n}_{(c)},$$

in which (a) represents a useful signal received from the aircraft k, (b) represents the interference signals from other aircraft, and (c) represents the noise; and A4: assuming the noise and the useful signal remain independent, determining a signal-to-noise ratio k of the useful signal received by the satellite from the aircraft k:

$$\xi_k = \frac{E[P_k |w_n^T h_k s_k|^2]}{E[w_n^T n]} = \frac{P_k |w_n^T h_k|^2}{\varpi \sigma^2 \|w_n\|^2},$$

in which $\sigma^2$ represents a noise power, $\varpi$ represents a noise figure, and E represents a mean square value.

3. The multi-beamforming optimization method for space-based ADS-B based on a coverage matrix according to claim 1, wherein in A1, a channel from the aircraft to the satellite satisfies a free-space loss model, the transmitting antenna of the aircraft is an omnidirectional antenna, the reception antenna of the satellite is a directional antenna, and the channel state $h_k$ from the aircraft k to the satellite is determined by means of a formula below:

$$h_k = \sqrt{g_k} f(\theta_k, \phi_k) a_k,$$

in which $g_k$ represents a path loss acquired according to a relative spatial position from the aircraft k to the satellite and a communication frequency; $f(\theta_k, \phi_k)$ represents the array element pattern, indicating an amplitude gain of an array element in an incident direction; and $a_k$ represents an array steering vector.

4. The multi-beamforming optimization method for space-based ADS-B based on a coverage matrix according to claim 3, wherein when radio signals from the aircraft k are incident towards a direction of the satellite, the array steering vector $a_k$ is determined by means of a formula below:

$$a_k = \left[ e^{j2\pi P_{AS,k}^T \frac{v_1}{\lambda \|P_{AS,k}\|}}, \ldots, e^{j2\pi P_{AS,k}^T \frac{v_{N_E}}{\lambda \|P_{AS,k}\|}} \right]^T,$$

in which $P_{AS,k}$ represents a relative position vector from the aircraft to the satellite, $\lambda = vC/fc$ represents a wavelength of a radio frequency used, vc represents a radio wave propagation velocity of $3 \times 10^8$ m/s, and fc represents a center frequency of 1090 MHz for an ADS-B signal.

5. The multi-beamforming optimization method for space-based ADS-B based on a coverage matrix according to claim 3, wherein in S2, analyzing the correct decoding probability of signals comprises the steps of:

C1: the ADS-B signals use binary Pulse Position Modulation (PPM) encoding, and the bit error rate $P_{ber}$ is calculated by means of a formula below:

$$P_{ber} = \int_{\sqrt{\xi_k}}^{+\infty} \frac{1}{\sqrt{2\pi}} e^{\left(-\frac{t^2}{2}\right)} dt = Q(\sqrt{\xi_k}),$$

in which the function Q represents a complementary cumulative distribution function of a standard normal distribution, and t represents time;

C2: when the number of bit errors in the ADS-B signal is smaller than or equal to 5, decoding the ADS-B signals correctly, wherein the correct decoding probability $P_d$ of the ADS-B signal is:

$$P_d = \sum_{n=1}^{5} C_{112}^n P_{br}^n (1 - P_{ber})^{112-n};$$

C3: when a digital beamforming vector W is used for spatial filtering, combining the signals of the aircraft k to acquire a signal-to-noise ratio vector $\xi_k = [\xi_{k,1}, \xi_{k,2}, \ldots \xi_{k,N_b}]^T$, wherein each component is the signal-to-noise ratio of the signal of the aircraft k in each beam, thereby obtaining a probability $P_{d,k}$ that the signals of aircraft k will be correctly decoded in each beam without signal collision, under different signal-to-noise ratios, $$P_{d,k} = [P_{d,k,1}, P_{d,k,2}, \ldots P_{d,k,N_b}]^T,$$

in which the aircraft k is covered by the $i^{th}$ beam, $i \in [1, N_b]$.

6. The multi-beamforming optimization method for space-based ADS-B based on a coverage matrix according to claim 3, wherein in S2, analyzing the signal collision probability comprises the steps of:

D1: calculating, according to the signal-to-noise ratios of the signals transmitted by each aircraft to the satellite, the number of aircraft that will cause co-channel interference to the aircraft k in the $i^{th}$ beam;

D2: given a proportion of aircraft equipped with transponders with different modes, the emission rate of each transponder, and the signal length, calculating a probability $P_{B,k,i}(m,t)$ that m ADS-B signals arrive at the satellite from the $i^{th}$ beam during time t, a probability $P_{A,k,i}(m,t)$ that m Mode A/C signals arrive at the satellite from the $i^{th}$ beam during time t, and a probability $P_{S,k,i}(m,t)$ that m Mode S signals arrive at the satellite from the $i^{th}$ beam during time t, as follows:

$$\begin{cases} P_{B,k,i}(m, t) = \frac{(\lambda_{B,k,i}t)^m}{m!}e^{-\lambda_{B,k,i}t} \\ P_{A,k,i}(m, t) = \frac{(\lambda_{A,k,i}t)^m}{m!}e^{-\lambda_{A,k,i}t}, \\ P_{S,k,i}(m, t) = \frac{(\lambda_{S,k,i}t)^m}{m!}e^{-\lambda_{S,k,i}t} \end{cases}$$

in which $\lambda_{B,k,i}$ represents the rate at which the interfering ADS-B signals in the beam reach the satellite, $\lambda_{A,k,i}$ represents the rate at which the interfering Mode A/C signals in the beam reach the satellite, and $\lambda_{S,k,i}$ represents the rate at which the interfering Mode S signals in the $i^{th}$ beam reach the satellite; and D3: deriving a probability $P_{BC,k,i}(\eta_B, \eta_A, \eta_S)$ that one ADS-B signal from aircraft k in the $i^{th}$ beam collide with $\eta_B$ other ADS-B signals, $\eta_A$ other Mode A/C signals, and $\eta_S$ other Mode S signals as follows:

$$P_{BC,k,i}(\eta_B, \eta_A, \eta_S) = P_{B,k,i}(\eta_B, 2\tau_B)P_{A,k,i}(\eta_A, \tau_B + \tau_A)P_{S,k,i}(\eta_s, \tau_B + \tau_S),$$

in which $\tau_B$, $\tau_A$ and $\tau_S$ represent a duration of a single ADS-B signal, a duration of a single Mode A/C signal, and a duration of a single Mode S signal, respectively, which are 120 us, 21 us, and 64 us, respectively.

7. The multi-beamforming optimization method for space-based ADS-B based on a coverage matrix according to claim 3, wherein in S5, the full-coverage constraint $\hat{g}_c(\Omega)$ within the given half angle of the satellite is verified by means of a formula below:

$$\hat{g}_c(\Omega) = \sum_{i=1}^{359}\sum_{j=1}^{\lfloor el_0\rfloor+2}C_{i,j} = 0,$$

in which C represents a coverage constraint matrix of $360*(\lfloor el_0\rfloor+1)$ dimensions, $C_{i,j}$ represents an element of an $i^{th}$ row and a $j^{th}$ column in the full coverage matrix C, $el_0$ represents a half angle that the satellite needs to cover, and $\Omega$ represents a vector of $2N_E*N_b$ dimensions.

8. The multi-beamforming optimization method for space-based ADS-B based on a coverage matrix according to claim 1, wherein a single-point coverage function in the coverage constraint matrix is expressed as:

$$C(az, el) = \begin{cases} 0, \text{ if } \exists\, i \in [1, N_b], P_{d,i}(az, el) \geq 90\% \\ 1, \text{ if } \forall\, i \in [1, N_b], P_{d,i}(az, el) < 90\% \end{cases},$$

in which $P_{d,i}$ (az,el) represents the correct decoding probability of the ADS-B signal broadcast at the corresponding position in the $i^{th}$ beam under the condition of no co-channel interference, el represents an elevation angle of radio waves incident to an ADS-B antenna array at any point C on the earth surface within the half angle covered by the satellite, and az represents an azimuth angle of the radio waves incident to the ADS-B antenna array.

9. The multi-beamforming optimization method for space-based ADS-B based on a coverage matrix according to claim 1, wherein calculating the correct reception probability of the ADS-B signals by the satellite with different signal-to-noise ratios and with different number of aircraft comprises the steps of:

E1: suggest that the reception of the ADS-B signals does not allow collision with other ADS-B signals or Mode S signals, then the correct reception probability of the ADS-B signals after the ADS-B signals collide with other ADS-B signals or Mode S signals is 0, wherein for the Mode A/C signals, the minimum reception probability of the ADS-B receiver for the case of interleaving 0 to 3 Mode A/C signals is specified by the standard:

$$P_{RA,k,i}(\eta_A) = \begin{cases} P_{d,k,i}, & \eta_A = 0 \\ 0.89P_{d,k,i}, & \eta_A = 1 \\ 0.64P_{d,k,i}, & \eta_A = 2, \\ 0.52P_{d,k,i}, & \eta_A = 3 \\ 0, & \eta_A \geq 4 \end{cases}$$

in which $P_{d,k,i}$ represents a probability that an ADS-B signal of the aircraft k is correctly received by the $i^{th}$ beam in a "clear" environment in which co-channel interference from other aircrafts is absent;

E2: calculating a probability $P_{rb_i,k}$ that the ADS-B signals of the aircraft k are correctly received in the $i^{th}$ beam:

$$P_{rb_i,k} = \Sigma_{\eta=0}^{\infty}P_{RA,k,i}(\eta)P_{BC,k,i}(0,\eta,0),$$

in which $P_{RA,k,i}$ represents the reception probability of the signal from aircraft k in the $i^{th}$ beam, $P_{BC,k,i}$ represents the collision probability that one ADS-B signal from aircraft k collides with $\eta_B$ other ADS-B signals, $\eta_A$ Mode A/C signals, and $\eta_S$ Mode S signals in the $i^{th}$ beam, and $(0, \eta, 0)$ indicates collision with only $\eta$ Mode A/C signals; and E3: when the aircraft k is covered by n out of all the $N_b$ beams, calculating a correct reception probability $P_{r,k}$ of the $k^{th}$ aircraft's ADS-B signal as follows:

$$P_{r,k} = \sum_{i=0}^{n}P_{rb_i,k} - \sum_{1\leq i\leq j\leq n}^{n}P_{r(b_i\cup b_j),k} + \sum_{1\leq i<j<k\leq n}^{n}P_{r(b_i\cup b_j\cup b_k),k} + \ldots + (-1)^{n-1}P_{r(\cup_{i=1}^{n}b_i),k},$$

in which $b_i$, $b_j$ and $b_k$ represent the $i^{th}$, $j^{th}$, and $k^{th}$ beams covering the aircraft k, respectively.

10. The multi-beamforming optimization method for space-based ADS-B multi-beamforming based on a coverage matrix according to claim 9, wherein in S4, determining the update interval of position messages at the update probability of 95% comprises the steps of:

F1: calculating a probability distribution $P_{t,k}(\Delta t)$ of the update interval of position messages of the aircraft k:

$$P_{t,k}(\Delta t) = P_{r,k}(1 - P_{r,k})^{\lfloor\frac{\Delta t}{T}\rfloor - 1},$$

in which T represents a time interval for the aircraft to send an ADS-B position message, wherein a probability corresponding to a time interval $\Delta t$ between a time, at which next position message of the aircraft k is correctly received by the ADS-B satellite, and $t_0$ can be expressed as:

$$\Delta t = \begin{cases} T & P_{r,k} \\ 2T & P_{r,k}(1-P_{r,k}) \\ \vdots & \\ nT & P_{r,k}(1-P_{r,k})^{n-1} \end{cases};$$

F2: calculating a cumulative probability distribution $\Psi_{t,k}(\Delta t)$ of the update interval of position messages of the aircraft k as follows:

$$\Psi_{t,k}(\Delta t) = 1 - (1-P_{r,k})^{\lfloor \frac{\Delta t}{T} \rfloor};$$

F3: calculating the probability distribution $P_t(\Delta t)$ of an average update interval of position messages of all the aircraft as follows:

$$P_t(\Delta t) = \frac{1}{N}\sum_{k=1}^{N} P_{r,k}(1-P_{r,k})^{\lfloor \frac{\Delta t}{T} \rfloor - 1};$$

F4: calculating the cumulative probability distribution $\Psi_t(\Delta t)$ of an average update interval of position messages of all the aircraft:

$$\Psi_t(\Delta t) = 1 - \frac{1}{N}\sum_{k=1}^{N} P_{r,k}(1-P_{r,k})^{\lfloor \frac{\Delta t}{T} \rfloor},$$

in which N represents a total number of aircraft covered by ADS-B satellite; and F5: verifying, by means of a formula below, the update interval of position messages at the update probability of 95% with respect to air traffic control surveillance performance requirements:

$$\Delta t_{95\%} = \Psi_t^{-1}(95\%).$$

* * * * *